(12) United States Patent
Lechler et al.

(10) Patent No.: US 9,272,766 B2
(45) Date of Patent: Mar. 1, 2016

(54) "IN-SITU" BALLAST WATER TREATMENT METHOD AND SYSTEM

(71) Applicant: Sea Knight Corporation, Virginia Beach, VA (US)

(72) Inventors: William M Lechler, Virginia Beach, VA (US); Claude R Thompson, Virginia Beach, VA (US)

(73) Assignee: SEA KNIGHT CORPORATION, Virginia Beach, VA (US)

( * ) Notice: Subject to any disclaimer, the term of this patent is extended or adjusted under 35 U.S.C. 154(b) by 239 days.

(21) Appl. No.: 14/028,622

(22) Filed: Sep. 17, 2013

(65) Prior Publication Data

US 2014/0076803 A1  Mar. 20, 2014

Related U.S. Application Data

(60) Provisional application No. 61/703,350, filed on Sep. 20, 2012.

(51) Int. Cl.
*C02F 3/02* (2006.01)
*C02F 3/34* (2006.01)
*B63J 4/00* (2006.01)
*C02F 3/26* (2006.01)
*C02F 103/00* (2006.01)

(52) U.S. Cl.
CPC . *B63J 4/002* (2013.01); *C02F 3/02* (2013.01); *C02F 3/26* (2013.01); *C02F 3/348* (2013.01); *C02F 2103/008* (2013.01); *C02F 2209/36* (2013.01); *C02F 2301/063* (2013.01); *Y02W 10/15* (2015.05)

(58) Field of Classification Search
CPC .............. B63J 4/002; C02F 3/02; C02F 3/26; C02F 3/348; C02F 2103/008; C02F 2209/36; C02F 2301/063; Y02W 10/15
USPC ................. 210/602, 603, 610, 611, 620, 220, 210/221.1, 221.2, 416.1
See application file for complete search history.

(56) References Cited

U.S. PATENT DOCUMENTS

| | | | | |
|---|---|---|---|---|
| 4,861,352 | A * | 8/1989 | Cheng | 75/708 |
| 5,932,112 | A * | 8/1999 | Browning, Jr. | B63B 11/04 210/205 |
| 6,921,488 | B1 * | 7/2005 | Jelmert | 210/764 |
| 2008/0251452 | A1 * | 10/2008 | Thompson et al. | 210/620 |

* cited by examiner

*Primary Examiner* — Fred Prince
(74) *Attorney, Agent, or Firm* — Peter J. Van Bergen

(57) ABSTRACT

A method and system for ballast water treatment is provided for a vessel with a ballast water tank system that pumps water from a local environment through a conduit into at least one tank on the vessel. The water contains aerobic micro-organisms from the local environment. Oxygen-containing gas is introduced into the water as it is pumped through the conduit. Living organisms are added into the water with the oxygen-containing gas introduced therein. As a result, the tank receives a mixture of the water with the oxygen-containing gas introduced therein and the living organisms added thereto. The living organisms are selected to consume (i) the aerobic micro-organisms, (ii) oxygen dissolved in the water, and (iii) food sources for the aerobic micro-organisms contained in the water. A vacuum is applied to the tank's ullage space at a point in time after the mixture is received in the tank.

15 Claims, 5 Drawing Sheets

"IN-SITU" BALLAST WATER TREATMENT METHOD AND SYSTEM

Pursuant to 35 U.S.C. §119, the benefit of priority from provisional application 61/703,350, with a filing date of Sep. 20, 2012, is claimed for this non-provisional application.

FIELD OF THE INVENTION

The invention relates generally to the treatment of ballast water, and more particularly to a method and system for treating ballast water entering and filling ballast tanks of vessels in order to control or eliminate various species of micro-organisms that could be harmful if released into a surrounding environment.

BACKGROUND OF THE INVENTION

Non-indigenous, nuisance and/or harmful species of aquatic micro-organisms are discharged into territorial waters by means of ballast water carried by ships from foreign ports. These micro-organisms are predominantly aerobic organisms that require oxygen throughout their life cycle, i.e., first as larvae or spores, then through their maturation process, finally as a mature organism. These aerobic micro-organisms obtain the necessary oxygen from "dissolved" atmospheric air present in the water contained in a vessel's ballast tanks. Dissolved air in water contains all the constituent gases present in the earth's atmosphere (including oxygen) that are not chemically bonded to the atomic elements of water. Therefore, the dissolved oxygen in water is freely available to sustain aquatic life.

SUMMARY OF THE INVENTION

Accordingly, it is an object of the present invention to provide a method and system for ballast water treatment.

Another object of the present invention is to provide an "in-situ" ballast water treatment method and system that eliminates harmful and/or nuisance species of aquatic micro-organisms in a vessel's ballast water.

Still another object of the present invention is to provide an effective ballast water treatment method and system that requires no ballast tank modifications.

Other objects and advantages of the present invention will become more obvious hereinafter in the specification and drawings.

In accordance with the present invention, a method of ballast water treatment is provided for a vessel with a ballast water tank system that pumps water from a local environment through a conduit into at least one tank on the vessel wherein the water contains aerobic micro-organisms from the local environment. Oxygen-containing gas is introduced into the water as it is pumped through the conduit. Living organisms are added into the water with the oxygen-containing gas introduced therein. As a result, the tank receives a mixture of the water with the oxygen-containing gas introduced therein and the living organisms added thereto. In the tank, a ullage space is defined in the tank above the mixture. The living organisms are selected to consume (i) the aerobic micro-organisms, (ii) oxygen dissolved in the water, and (iii) food sources for the aerobic micro-organisms contained in the water. A vacuum is applied to the ullage space at a point in time after the mixture is received in the tank. The vacuum is in the range of approximately −2 to −4 pounds per square inch.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
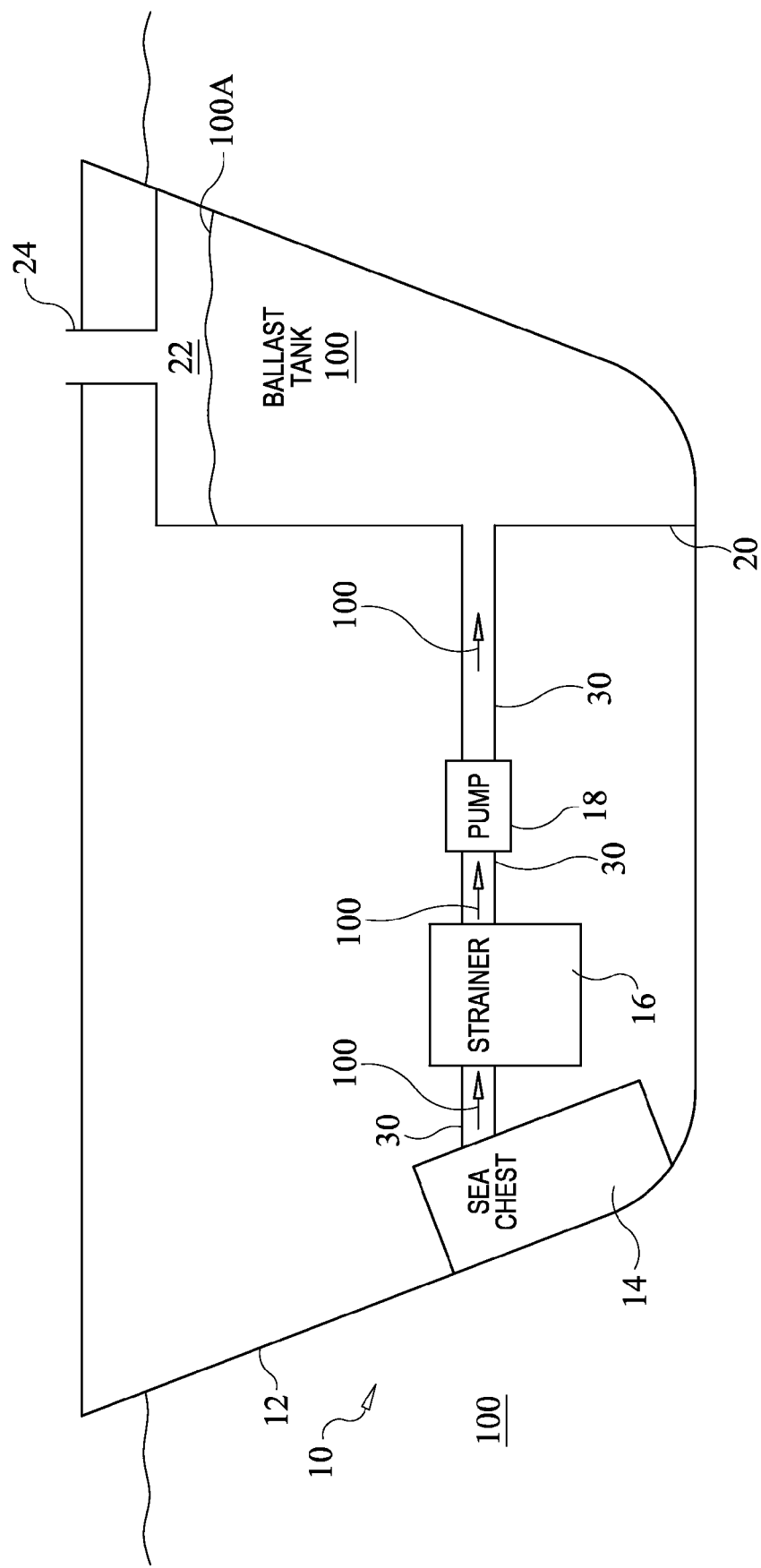
FIG. 1 is a schematic view of a conventional ballast water tank system on a vessel.

Referring now to the drawings and more particularly to FIG. 1, a portion of a vessel 10 (e.g., ship, barge, etc., designed for over-water travel on the ocean, a sea, a river, etc.) is shown. More specifically, basic elements of the vessel's conventional ballast water tank system are shown. The relative sizes, shapes, and particular construction of the various elements are not limitations of the present invention as the figures presented herein merely depict the various functional relationships between the elements. In addition, the number of the various elements comprising the ballast water tank system on board vessel 10 is not a limitation of the present invention. It is noted that the essential features and functions of a ballast water tank system are well known in the art.

Briefly and in general, one or more sea chest 14 is mounted in the lower portion of the vessel's hull 12 at or near the keel thereof. Sea chest 14 facilitates the intake of water 100 that will ultimately be supplied to one or more ballast tank 20. Water 100 is pumped from sea chest 14 through a strainer 16 by a pump 18. Strainer 16 is designed to collect larger materials (e.g., fish, sticks, seaweed, etc.) so that they are kept out of pump 18 and, ultimately, ballast water tank 20. Ballast water tank 20 is thereby filled with water 100 to a desired level in tank 20. A conduit 30 (or multiple conduits) used to transport water 100 to/from these elements is indicated by reference numeral 30.

The air space in ballast water tank 20 above the surface 100A of water 100 in tank 20 is known as ullage space 22. A vent 24 in communication with ullage space 22 allows gases in ullage space 22 to be released into the surrounding atmosphere. It is to be understood that the term "ullage space" as used herein is not limited to the scenario illustrated in FIG. 1. That is, if the ballast water tank is completely filled with ballast water, the ullage space could be defined by the air space in the ballast water tank's vent(s).

The present invention is a system and method for eliminating a variety of harmful/nuisance micro-organisms (not shown) naturally present in water 100 pumped into tank 20. In general, the harmful/nuisance micro-organisms of concern are those that are indigenous to the environment where water 100 originated (e.g., where vessel 10 began its voyage), but non-indigenous to the environment where water 100 in tank 20 will be discharged (e.g., where vessel 10 terminates its voyage). Furthermore, the harmful/nuisance micro-organisms of concern are typically aerobic in nature so that they require the presence of dissolved oxygen in water 100 as well as the presence of other organisms (e.g., zoo plankton, phytoplankton) that are food sources. Accordingly, for the remainder of this description, the harmful/nuisance micro-organisms present in water 100 pumped into tank 20 will be referred to as aerobic ballast water ("ABW") micro-organisms.

The particular ABW micro-organisms and their food sources will vary depending on the geographic origin of water 100 in tank 20. Further, the level of environmental impact associated with a particular ABW micro-organism can be related to the geographic region where water 100 in tank 20 will be discharged. Accordingly, the following description of the present invention will not be directed to any particular ABW micro-organisms. Indeed, a great advantage of the present invention is its ability to be adapted to the treatment of any water 100 in tank 20 regardless of its origin.

Figure 2:
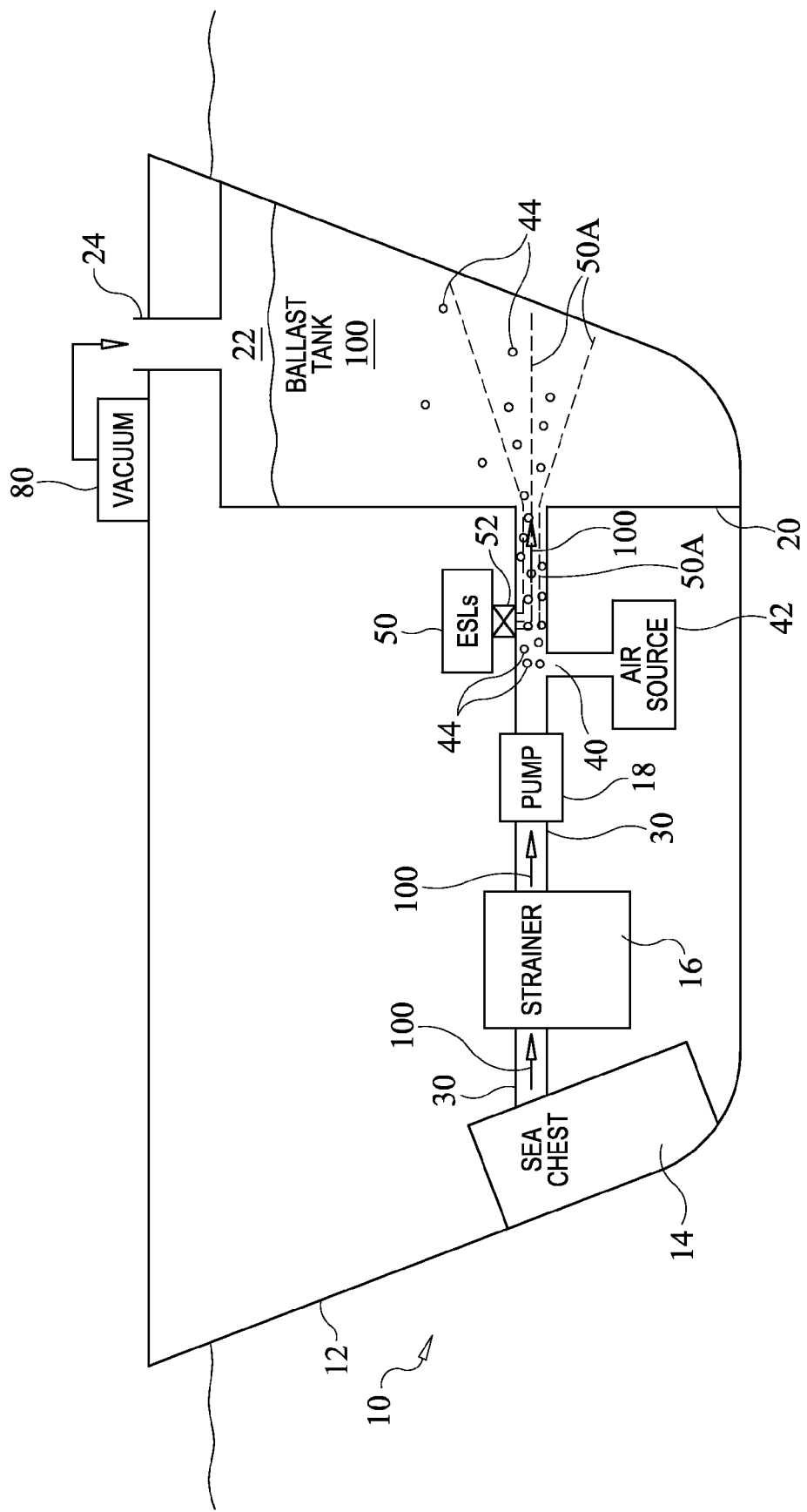
FIG. 2 is a schematic view of a ballast water tank system equipped with a ballast water treatment system in accordance with an embodiment of present invention.

Referring now to FIG. 2, an embodiment of an "in-situ" ballast water treatment system of the present invention is shown coupled to the ballast water tank system described above and shown in FIG. 1. In general, the present invention is easily installed downstream of pump 18 and somewhere in/along conduit 30 leading to tank 20, e.g., between pump 18 and tank 20 in the illustrated embodiment. An orifice 40 provided in conduit 30 admits/introduces an oxygen-containing gas into the flow of water 100 moving through conduit 30. For example, air from an air source 42 (e.g., ambient air, a source of compressed air, a pressurized container of air, etc.) could be admitted/introduced into the flow of water 100 moving through conduit 30 such that bubbles of air 44 are sparged into the flow of water 100 in conduit 30. Each bubble of air 44 contains some amount of oxygen.

The method and system of the present invention further provides for the introduction of environmentally-safe living ("ESL") organisms (represented by dashed lines 50A) from an ESL supply 50 into water 100 prior to its introduction into tank 20. In the illustrated embodiment, ESL organisms 50A are introduced into conduit 30 via a valve 52 (e.g., manually or automatically controlled valve, a metering valve, etc.) disposed between ESL supply 50 and conduit 30. ESL organisms (or "ESLs" as they will be referred to hereinafter) 50A are selected to consume oxygen and the food sources of the ABW micro-organisms in the tank's water 100. ESLs 50A can be added in dry form (e.g., powders, particles, etc.) or mixed in an inert liquid without departing from the scope of the present invention. In either case, the presence of additional oxygen in water 100 (i.e., as provided by bubbles of air 44) provides additional energy to ESLs 50A. The combination of air 44 and ESLs 50A are deposited along with water 100 into ballast tank 20 as shown. The effectiveness of ESLs 50A in tank 20 is enhanced as ESLs 50A are energized by air 44 and immediately begin to consume ABW micro-organisms in water 100 as well as other food sources for the ABW micro-organisms in water 100.

ESLs 50A can be selected to consume oxygen and the ABW micro-organisms' food sources, and could further include species selected to consume the ABW micro-organisms that have died. Thus, ESLs 50A added to water 100 could be a mix or "cocktail" of different types of living organisms to combat different types of unwanted ABW micro-organisms in water 100. The particular type(s) of living organisms selected for ESLs 50A will depend on the type of ABW micro-organisms present in water 100 as well as the ecosystem in which "treated" water 100 will be discharged. That is, the selected ESLs 50A should be environmentally safe for the ecosystem receiving the discharged/treated ballast water. Such selection would be understood by those skilled in the art and is not a limitation of the present invention.

Figure 3:
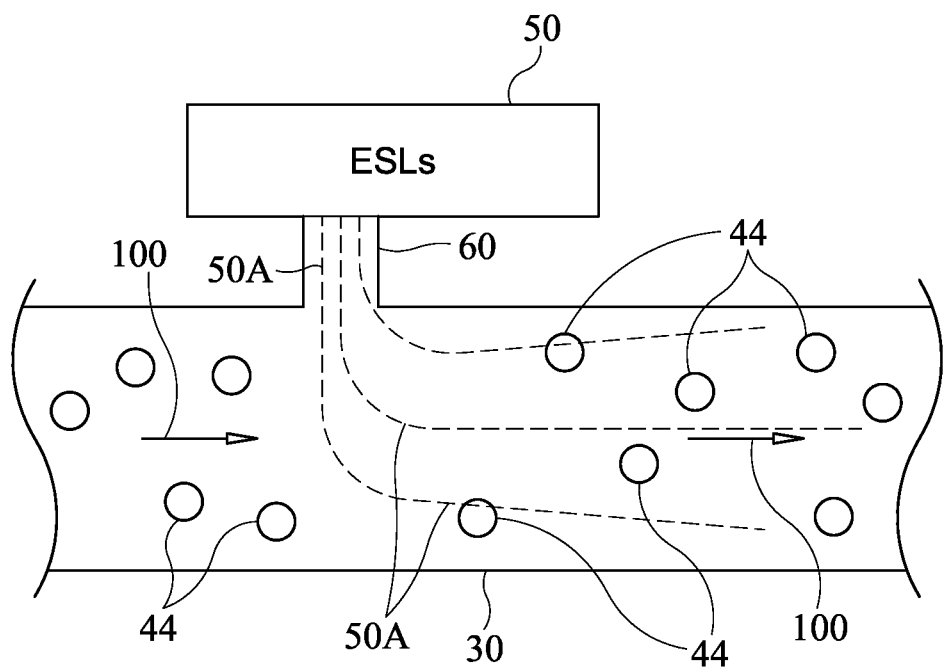
FIG. 3 is an isolated schematic view of an environmentally-safe living organism feed system of the ballast water treatment system in accordance with another embodiment of the present invention.
Figure 4:
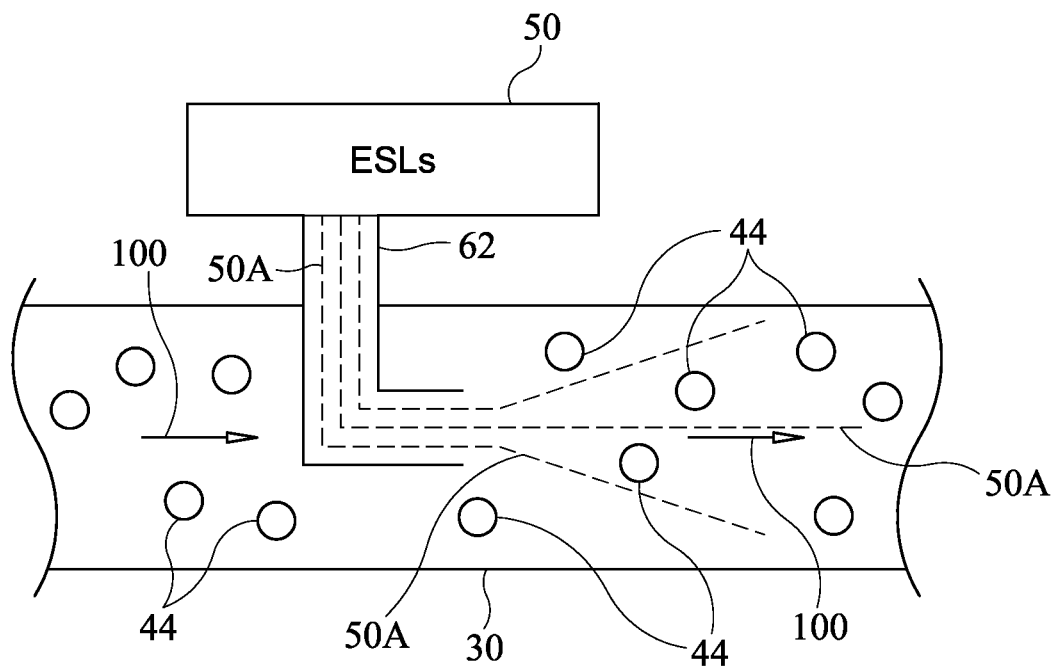
FIG. 4 is an isolated schematic view of an environmentally-safe living organism feed system of the ballast water treatment system in accordance with still another embodiment of present invention.

The introduction of ESLs 50A can be achieved in a variety of ways without departing from the scope of the present invention. For example, FIG. 3 illustrates another ESL introduction approach in which ESL supply 50 is coupled to conduit 30 by an open-ended feed tube 60 terminated at the wall of conduit 30. Tube 60 is sized to admit a fixed rate/volume of ESLs 50A drawn into water 100 as it is pumped past tube 60. Another approach is illustrated in FIG. 4 where a feed tube 62 is fed through the wall of conduit 30 with its open end 62A positioned centrally in conduit 30. This will allow ESLs 50A to "fan out" in a cone shape so that they are readily dispersed throughout water 100 moving through conduit 30.

Figure 5:
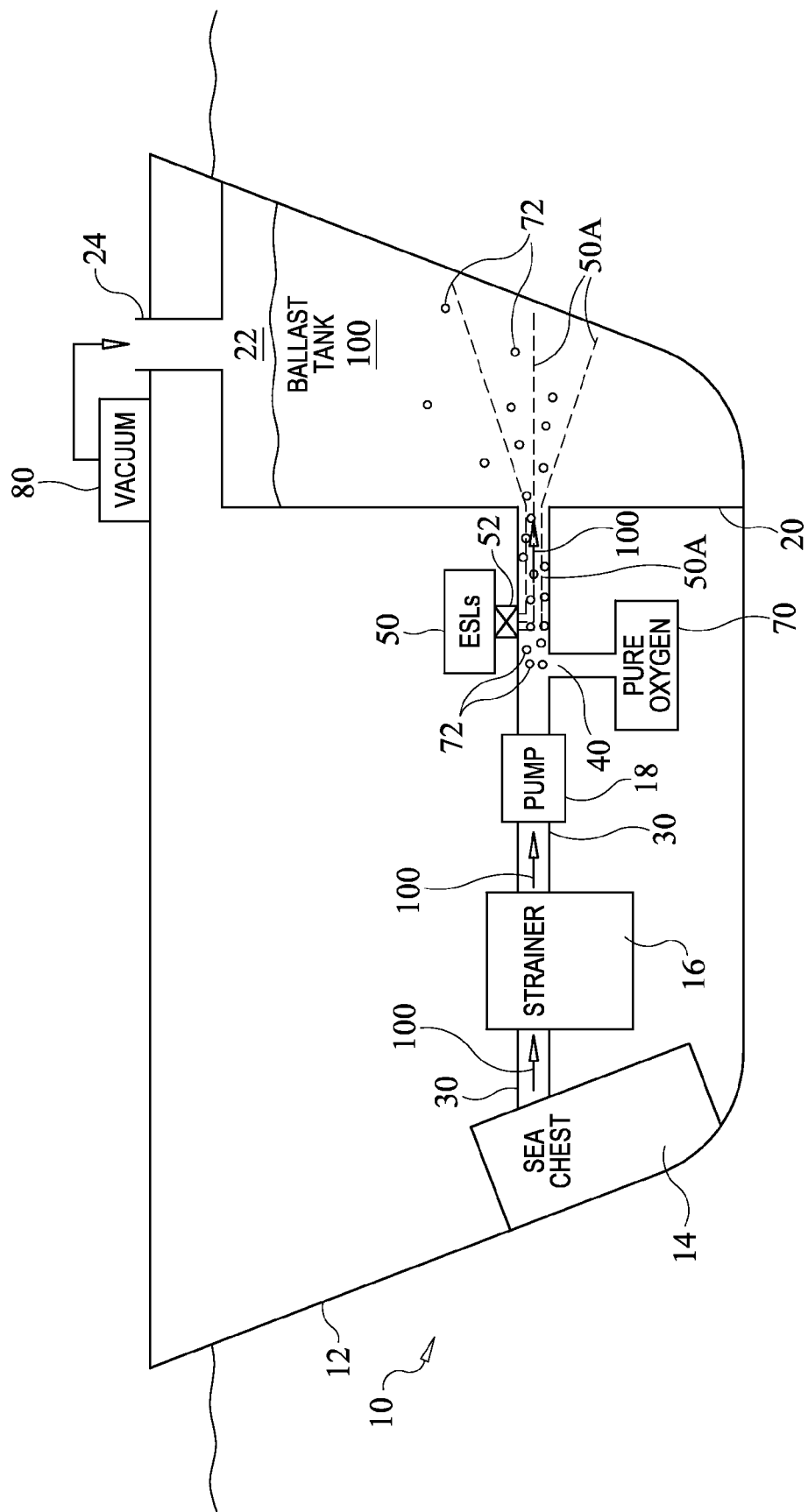
FIG. 5 is a schematic view of a ballast water tank system equipped with another embodiment of the ballast water treatment system that supplies pure oxygen to incoming ballast water.

Another embodiment of the present invention is illustrated in FIG. 5 where a source 70 of pure oxygen is coupled to conduit 30 downstream of pump 18 so that bubbles of pure oxygen 72 are sparged into water 100. The use of pure oxygen may further enhance (e.g., speed up) the "feeding" function of ESLs 50A.

Regardless of which of the above-described embodiments is employed, a mixture of water 100 (to include ABW aerobic micro-organisms), air bubbles 40 (or pure oxygen bubbles 72), and ESLs 50A are introduced into tank 20 until such time that tank 20 is filled to a desired ballast level in accordance with vessel requirements. Once tank 20 is filled to its desired level, pump 18, air source 42, and supply 50 are turned "off". Over time (e.g., during the course of the vessel's voyage), ESLs 50A will reduce the amount of ABW micro-organisms in water 100 (that is in tank 20) to an acceptable level. Once this has occurred (i.e., as determined by manual or automatic testing of water 100 in tank 20, empirical knowledge, etc.), a vacuum is applied to ullage space 22. For example, a vacuum source 80 can be coupled to ullage space 22 via vent 24 in tank 20 as shown in FIGS. 2 and 5 such that vacuum source 80 is in fluid communication with ullage space 22. As explained in U.S. Pat. Nos. 7,442,304 and 7,513,998, a low-level vacuum in the range of approximately $-2$ to $-4$ pounds per square inch applied to ullage space 22 functions to (i) draw gases out of ullage space 22, and (ii) draw dissolved oxygen from water 100 in tank 20 over extended periods associated with the voyage of vessel 10. As a result of such vacuum application to ullage space 22, any remaining ABW aerobic micro-organisms and ESLs 50A present in the tank's water 100 die as their dissolved oxygen source is reduced or eliminated by the low-level vacuum.

Oxygen depletion brought about by the above-described vacuum application is achieved over time such as the length of time defining the vessel's voyage. Thus, by the completion of the voyage of vessel 10, the goal of the present invention is that water 100 in tank 20 will be depleted of oxygen such that water 100 remaining in tank 20 is completely or substantially free of all aerobic micro-organisms to include ESLs 50A. Note that some of the aerobic micro-organisms may be facultative in that they can also exist anaerobically. Further, some anaerobes may exist in the tank's water 100 and, in rare instances, some of the aerobic micro-organisms may be facultative in nature in that they can also exist anaerobically. If either or both of these situations arise, it is unlikely that the anaerobic organisms will survive the treatment process described herein or a ballast water discharge operation. That is, the relatively oxygen-rich water surrounding a vessel will greatly reduce or eliminate anaerobes included in the ballast water 100 in tank 20 that is discharged into the surrounding water.

Figure 6:
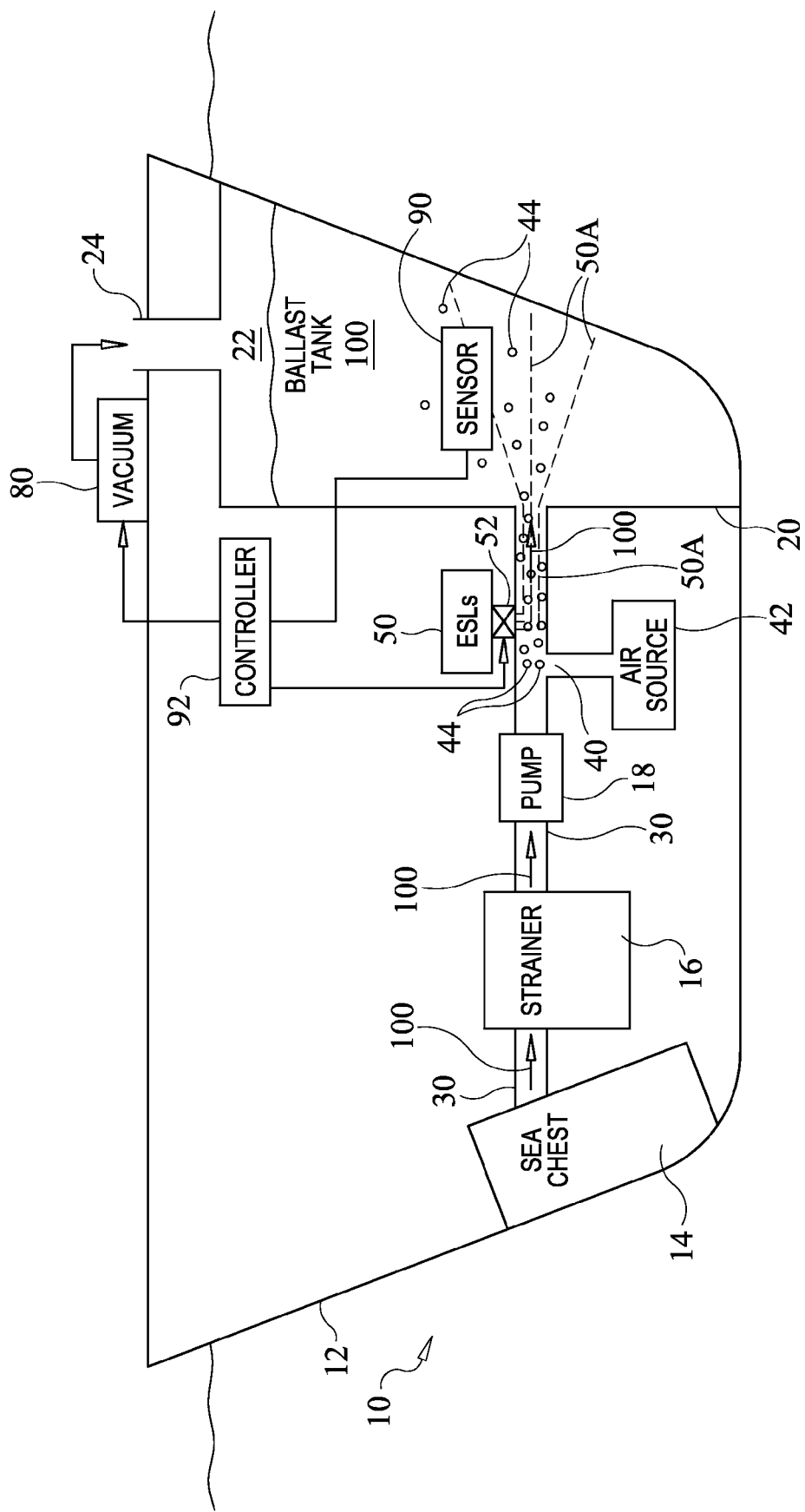
FIG. 6 is a schematic view of a ballast water tank system equipped with another embodiment of the ballast water treatment system that provides for the automatic control of living organism dosage and vacuum application.

Still another embodiment of the present invention is illustrated in FIG. 6 where a control system is provided to monitor the amount of ABW micro-organisms in the tank's water 100 to thereby control the introduction of ESLs 50A and/or the application of vacuum to ullage space 22 by vacuum source 80. One or more monitoring sensor 90 placed in tank 20 is sensitive to the presence/amount of ABW micro-organisms present therein. A controller 92 coupled to sensor 90 uses the amount of ABW micro-organisms so-sensed to, for example, increase/decrease the amount of ESLs 50A being added to water 100 (e.g., via control of valve 52 in the illustrated embodiment) during the filling of tank 20, activate/deactivate vacuum source 80 to apply/remove the vacuum applied to ullage space 22, and/or increase/decrease the amount of applied vacuum.

The advantages of the present invention are numerous. The ballast water treatment approaches described herein do not require any modifications to a vessel's ballast water tank. No bulky holding or treatment tanks are required as the ballast water is treated "in-situ". All system components are easily coupled to the existing ballast water tank system. Thus, the present invention provides simple, inexpensive, and effective ballast water treatment approaches that can be readily adopted by the shipping industry.

Although the invention has been described relative to a specific embodiment thereof, there are numerous variations and modifications that will be readily apparent to those skilled in the art in light of the above teachings. For example, the present invention could also be coupled to a ballast water tank's stripping system used to pump out the very bottom of a ballast water tank. It is therefore to be understood that the invention may be practiced other than as specifically described.

What is claimed as new and desired to be secured by Letters Patent of the United States is:

1. A method of ballast water treatment, comprising the steps of:
   providing a vessel with a ballast water tank;
   pumping water from a local environment through a conduit coupled to the tank wherein the water contains aerobic micro-organisms from the local environment;
   introducing oxygen-containing gas into the water as it is pumped through the conduit wherein additional oxygen is available in the water as it is pumped through the conduit;
   adding living organisms into the water as it is pumped through the conduit with the oxygen-containing gas introduced therein, wherein the additional oxygen is utilized by the living organisms;
   filling the tank with a mixture of the water with the oxygen-containing gas introduced therein and the living organisms added thereto, and wherein a ullage space is defined in the tank above the mixture, the living organisms being selected to consume (i) the aerobic micro-organisms, (ii) oxygen dissolved in the water and the additional oxygen, and (iii) food sources for the aerobic micro-organisms contained in the water; and
   applying a vacuum to a vent defined in the vessel and in fluid communication with the ullage space at a point in time after the mixture is received in the tank, the vacuum being in the range of approximately −2 to −4 pounds per square inch.

2. A method according to claim 1, wherein the oxygen-containing gas comprises pure oxygen.

3. A method according to claim 1, wherein said step of adding includes the step of dispersing the living organisms in the conduit.

4. A method according to claim 1, wherein said step of applying includes the step of monitoring amounts of the aerobic micro-organisms in the mixture to determine said point in time.

5. A method according to claim 1, wherein said step of applying includes the step of regulating the vacuum.

6. A method according to claim 1, wherein the living organisms are selected to be harmless to a selected ecosystem.

7. A method of ballast water treatment, comprising the steps of:
   providing a vessel with a ballast water tank;
   pumping water from a local environment through a conduit coupled to the tank wherein the water contains aerobic micro-organisms from the local environment;
   introducing oxygen-containing gas into the water as it is pumped through the conduit wherein additional oxygen is available in the water as it is pumped through the conduit;
   adding living organisms into the water as it is pumped through the conduit with the oxygen-containing gas introduced therein, wherein the additional oxygen is utilized by the living organisms;
   filling the tank with a mixture of the water with the oxygen-containing gas introduced therein and the living organisms added thereto, and wherein a ullage space is defined in the tank above the mixture, the living organisms being selected to consume (i) the aerobic micro-organisms, (ii) oxygen dissolved in the water and the additional oxygen, and (iii) food sources for the aerobic micro-organisms contained in the water;
   monitoring amounts of the aerobic micro-organisms in the mixture; and
   applying a vacuum to a vent defined in the vessel and in fluid communication with the ullage space after the mixture is received in the tank and based on the amounts of the aerobic micro-organisms so-monitored, the vacuum being in the range of approximately −2 to −4 pounds per square inch.

8. A method according to claim 7, wherein the oxygen-containing gas comprises pure oxygen.

9. A method according to claim 7, wherein said step of adding includes the step of dispersing the living organisms in the conduit.

10. A method according to claim 7, wherein said step of applying includes the step of regulating the vacuum.

11. A method according to claim 7, wherein the living organisms are selected to be harmless to a selected ecosystem.

12. A system for ballast water treatment on board a vessel with a ballast water tank system for pumping water from a local environment through a conduit into at least one tank on the vessel wherein the water contains aerobic micro-organisms from the local environment, said system comprising:
   a source adapted to be coupled to the conduit for introducing oxygen-containing gas into the water as it is pumped through the conduit wherein additional oxygen is available in the water as it is pumped through the conduit;
   a supply of living organisms adapted to be coupled to the conduit, said supply introducing said living organisms into said water with said oxygen-containing gas introduced therein, wherein the additional oxygen is utilized by said living organisms, wherein the tank is filled with a mixture of the water with said oxygen-containing gas introduced therein and said living organisms added thereto, and wherein a ullage space is defined in the tank above said mixture, said living organisms being selected to consume (i) the aerobic micro-organisms, (ii) oxygen dissolved in the water and the additional oxygen, and (iii) food sources for the aerobic micro-organisms contained in the water; and a vacuum source adapted to be in fluid communication with the ullage space for applying a vacuum to the ullage space at a point in time after said mixture is received in the tank, said vacuum being in the range of approximately −2 to −4 pounds per square inch.

13. A system as in claim 12, wherein said oxygen-containing gas comprises pure oxygen.

14. A system as in claim 12, further comprising at least one sensor adapted to be positioned in the tank for monitoring amounts of the aerobic micro-organisms in said mixture wherein said amounts are used to determine said point in time.

15. A system as in claim 12, wherein said living organisms are selected to be harmless to a selected ecosystem.

* * * * *